INVENTORS.
GEORGE A. KAPPENHAGEN &
CECIL P. PORTERFIELD
BY
Tillberry & Body
ATTORNEYS July 18, 1967 G. A. KAPPENHAGEN ETAL 3,332,036

HIGH FREQUENCY ELECTRICAL POWER SOURCE WITH PULSATING CONTROL

Filed April 17, 1964

4 Sheets-Sheet 2

INVENTORS.
GEORGE A. KAPPENHAGEN &
CECIL P. PORTERFIELD
BY

ATTORNEYS

INVENTORS.
GEORGE A. KAPPENHAGEN &
CECIL P. PORTERFIELD
BY
[signature]
ATTORNEYS

HIGH FREQUENCY ELECTRICAL POWER SOURCE WITH PULSATING CONTROL

Filed April 17, 1964

INVENTORS.
GEORGE A. KAPPENHAGEN &
CECIL P. PORTERFIELD
BY
Tilberry & Body
ATTORNEYS 3,332,036

HIGH FREQUENCY ELECTRICAL POWER SOURCE WITH PULSATING CONTROL

George A. Kappenhagen and Cecil P. Porterfield, Cleveland, Ohio, assignors to The Ohio Crankshaft Company, Cleveland, Ohio, a corporation of Ohio
Filed Apr. 17, 1964, Ser. No. 360,515
6 Claims. (Cl. 331—173)

This invention pertains to the art of electric heating and more particularly to a high a frequency power source for energizing an electrical industrial heating apparatus.

The invention is particularly applicable to a radio frequency power source used to energize an induction heating apparatus comprised of a vacuum tube oscillator and a high voltage DC power source and it will be described with particular reference thereto; however, it will be appreciated that the invention has much broader applications and may be used to supply power for other types of high frequency electrical industrial heating apparatus with other types of oscillators such as, without limitation, solid state oscillators, laser oscillators and the like.

The term "industrial heating" as used herein refers to the art of increasing the temperature of a substance, e.g., metal, for processing, annealing, hardening, melting or for other purposes.

High frequency or radio frequency power sources as used in induction heating apparatus normally comprise: a load coil to be positioned around or adjacent a workpiece to be heated; a vacuum tube power oscillator connected, either directly or through a transformer, to the load coil; and, a source of DC voltage in the form of rectified, alternating current for energizing the oscillator. In operation, the oscillator supplies high frequency currents to the load coil which induce high frequency voltages in the workpieces. These high frequency voltages cause high frequency currents in the workpiece which generate $I^2R$ heat energy to raise the temperature of the workpiece to any desired level.

The temperature which the workpiece reaches may be controlled by varying the average rate of power input to the workpiece or the time period over which the power is supplied to the workpiece, or both. The present invention deals to a large extent with varying the average rate of power input to the workpiece so that for any given time period the workpiece may be made to reach the desired temperature. More generally, the invention pertains primarily to smoothly varying the output power of an industrial heating oscillator over a large range.

In the past, the rate of power output of the oscillator has been varied by: changing the DC voltage applied to the oscillator; adjusting the coupling of the coil to the workpiece or the coil to the oscillator such as, for example, by the taps on an output coupling transformer; or by varying the duty cycle of the oscillator. All of these prior arrangements for changing the average power output of the oscillator had serious limitations.

If the DC voltage supplied to the oscillator is reduced, the maximum power output is lowered, but the efficiency of the oscillator also suffers. If the coupling between the workpiece and the oscillator is varied, either the range of power control is relatively small or the power cannot be changed smoothly from one power output to the other.

It has been suggested that the duty cycle of the oscillator, and thus the output power, be varied by biasing the grid of the oscillator tube negative beyond the value where plate current can flow and then pulsing the grid with positive voltage pulses. In this manner the plate current, in effect, is switched on and off so that the average power is determined by the ratio of on time to off time. By varying the time duration and the time spacing between each pulse the average power output can be readily varied. Since the oscillator is operating at maximum power when turned on and zero power when turned off, the efficiency of the oscillator remains high with variations in the average output power.

Heretofore the switching of the oscillator on and off by pulsing the grid circuit of the oscillator tube was almost instantaneous and the transients or voltage surges created by this rapid switching developed high peak voltages both in the oscillator and in the power supply necessitating transformers, condensers and other components much larger in size and greater in cost than the transformers, condensers and other components which could be used if such transients were not present. For this reason, controlling of the power oscillator of an electrical industrial heating apparatus with a pulse controlled output power has not been successful.

The present invention deals primarily with a control for switching the oscillator on and off to control the duty cycle and, thus, the output power of an oscillator in such a manner that the voltage transients or voltage surges are eliminated or reduced and the size and cost of the components used in the power supply and the oscillator can be held to a minimum.

It is to be noted that the present invention differs from high frequency power sources used for generating pulses of electrical energy, e.g., in radar or radio code communications, which are supplied to a transmitting antenna for creating electro-magnetic waves. In such instances, the primary interest is the production of peak or maximum power outputs at all times that the source is generating power. In industrial heating apparatus, the primary concern is not maximum or peak output but the average power output of the power source for time periods usually in excess of several seconds up to and including days and months.

In accordance with the invention, there is provided a control for a power oscillator which switches the oscillator on and off with a signal comprising a succession of pulse-like shapes, each pulse-like shape having a wave front with an incipient vertical slope of low order over a substantial length of the wave front for turning the oscillator on and a wave back with an incipient vertical slope of lower order over a substantial length of the wave back for turning the oscillator off. Although this signal may be voltage, in accordance with the preferred embodiment of the invention, the signal includes a succession of high and low impedance levels which will be hereinafter described in detail. The term "impedance" is used herein in its broad sense to include resistance alone or resistance plus reactance.

In accordance with a specific aspect of the present invention, there is provided an improvement in a radio frequency heating device including a heating load and a radio frequency oscillator circuit for powering the load. This improvement comprises a circuit for creating a signal comprising a succession of pulse-like shapes, each pulse-like shape having a wave front, a body and a wave back, the wave front and wave back having an incipient vertical slope of controlled low order over a substantial length of the wave front and wave back, means for interposing the signal in the oscillator circuit for starting the oscillator circuit with the wave front, sustaining oscillations of the oscillator circuit with the body and stopping oscillations of the oscillator circuit with the wave back, and means for changing the length of the body of the pulse-like shapes to vary the duty cycle of the oscillator circuit.

In accordance with a more limited aspect of the present invention there is provided an improvement in a radio frequency heating device including a heating load and a radio frequency oscillator circuit for powering the load. This improvement comprises a circuit for creating a succession of high and low impedance levels with a generally vertical transfer contour between the impedance levels, means for interposing the impedance levels in the oscillator circuit to start, sustain and stop the oscillations of the oscillator, and means for varying the relative lengths of the high and low impedance levels to vary the duty cycle of the radio frequency oscillator.

In accordance with a more limited, but highly important, aspect of the present invention the transfer contours between the impedance levels each have a controlled gradual vertical slope for a substantial initial portion of the contour.

The phrase "creating a succession of high and low impedance levels" as used herein refers to the production of a controlled impedance having a pulse-like appearance and including a succession of alternately, high and low impedance values wherein the controlled impedance plotted with respect to time has a pulse-like shape somewhat similar, for analytical purposes, to a succession of voltage or current pulses plotted with respect to time with the low impedance values forming the datum or reference line and the high impedance values forming the pulses.

The phrase "vertical transfer contour" as used herein refers to the shape of the curve of the controlled impedance plotted against time as it swings between the high and the low levels or values.

In accordance with another aspect of the present invention there is provided a method of starting and stopping the oscillations of a radio frequency power oscillator of the type adapted for electric heating, the method comprising creating a signal including a succession of pulse-like shapes each having a wave front portion and a wave back portion and each of these portions having an incipient vertical slope of controlled low order over a substantial length of the portion, and turning the oscillator on with the wave front portion and turning the oscillator off with the wave back portion.

In accordance with still another aspect of the present invention there is provided a method of starting, sustaining and stopping the oscillations of a radio frequency, power oscillator of the type used in electrical heating. This method includes creating a succession of high and low impedance levels having generally vertical contours between the impedance levels with the vertical contours having a controlled gradual vertical slope for a substantial incipient portion, turning the oscillator off with the high impedance levels, turning the oscillator on with the low impedance levels and varying the relative length of the time of the levels to vary the duty cycle of the oscillator.

An industrial heating apparatus of the type contemplated by the present invention generally includes a power oscillator connected onto a load, usually a coil, an alternating current line supply and a rectifier for rectifying the alternating current line voltage into a DC voltage for operation of the power oscillator. Since the line voltage is often relatively low compared to the DC voltage needed for the operation of the oscillator, a transformer is interposed between the rectifier and the alternating current supply line and a switch, or circuit breaker, is positioned between the supply line and the transformer for turning the oscillator on and off. The transformer between the alternating current line supply and the oscillator includes primary and secondary windings inductively coupled by a ferro-magnetic core. This core creates transient fields when the alternating current line voltage is applied to the primary winding upon closing of the circuit breaker between the transformer and the supply lines. These transient fields generated within the transformer core, in turn, cause high transient voltages to be developed across the secondary windings of the transformer. In practice it is becoming quite common to construct the rectifier between the transformer and the power oscillator with solid state rectifying devices which have somewhat limited voltage capacities. Consequently, the high transient voltages created across the secondary windings of the transformer often cause high voltage peaks or spikes in the solid state rectifier which peaks often cause damage to the rectifiers and may result in complete failure of the rectifiers. In the past it was common practice to increase the voltage capacity of the solid state rectifiers to overcome this problem; however, such an expedient was relatively expensive and required a substantially larger unit than needed for the general operation of the heating installation.

This problem has been completely overcome by another aspect of the present invention which is directed toward an apparatus for preventing high transient voltage peaks in the solid state rectifiers positioned between the transformer and the power oscillator of an industrial heating installation.

An electric heating device includes an oscillator connected to the output of a solid state rectifier which is, in turn, connected onto the secondary windings of a voltage supply transformer. If the transformer is energized while the oscillator is conditioned to oscillate, the rapid starting of the oscillator causes transient voltages which are fed back into the solid state rectifier causing damage thereto. The previous solution to this problem was the provision of a solid state rectifier having a higher voltage capacity than required for the normal operation of the heating installation. As mentioned before, this substantially increased the cost and size of the heating installation.

This problem is overcome by another aspect of the present invention which is directed toward an arrangement for protecting the solid state rectifying means between the oscillator and the transformer.

In accordance with this aspect of the present invention there is provided an improvement in an electric heating device comprising a radio frequency oscillator, a heating load driven by the oscillator, an alternating current input, a transformer between the input and the oscillator and a solid state rectifying means between the transformer and the oscillator. This improvement comprises first switch means for connecting the input to the transformer, circuit means for blocking oscillation of the oscillator, and means for closing the first switch means only when the circuit means is conditioned to block oscillation of the oscillator.

The primary object of the present invention is the provision of a control for a power oscillator of the type used for industrial heating which control can be adjusted to vary smoothly the average output power of the power oscillator over a large range.

Another object of the present invention is the provision of a control for a power oscillator of the type used for industrial heating which control can be adjusted to vary the average output power of the oscillator without causing a corresponding change in the efficiency of the oscillator.

Another object of the present invention is the provision of a control for a power oscillator of the type used for industrial heating which control can be adjusted to vary the average output power of the oscillator by intermittently starting and stopping the oscillator and varying the ratio of off time to on time and which control reduces the transient voltage peaks caused by this repetitive starting and stopping of the oscillator.

Another object of the present invention is the provision of a control for a power oscillator of the type used for industrial heating which control can turn the oscillator on and off without developing damaging voltage transients or voltage peaks.

Still another object of the present invention is the provision of a control for a power oscillator of the type used for industrial heating which control turns the oscillator on and off by a signal having a succession of pulse-like shapes, each of which have a controlled wave front and wave back to limit voltage transients or voltage surges.

A further object of the present invention is the provision of a control for a power oscillator of the type used for industrial heating which control can be adjusted to vary the average output power of the oscillator by intermittently starting and stopping the oscillator with a controlled succession of high and low impedance levels, with the transfer contour, between the levels, being so formed to reduce the transients developed during the starting and stopping of the oscillator.

Yet a further object of the present invention is the provision of a control for a power oscillator of the type used for industrial heating which control can be adjusted to vary the average output power of the oscillator by intermittently starting and stopping the oscillator with a controlled succesion of high and low impedance levels which impedance levels are formed, by a circuit means, to have a contour which will substantially prevent transients during the starting and stopping of the oscillator.

Another object of the present invention is the provision of a control for a power oscillator of the type used for industrial heating which control includes a circuit means for starting, sustaining and stopping oscillation of the oscillator in such a manner that transient voltages and voltage surges are reduced.

Still a further object of the present invention is the provision of a control for a power oscillator of the type used for industrial heating which control includes a circuit means for starting, sustaining and stopping oscillation of the oscillator without substantial transient voltages and voltage surges being created so that the voltage capacity of the components of the oscillator and its accessories can be lowered.

Another object of the present invention is the provision of an industrial heating device including an oscillator, an alternating current line supply, a transformer for changing the voltage of the line supply and a solid state rectifying means between the transformer and the oscillator which device includes means for preventing, or substantially limiting, the value of the voltage peaks in the solid state rectifying means when the oscillator is turned on.

These and other objects and advantages will become apparent from the following description used to illustrate the preferred embodiment of the invention as read in connection with the accompanying drawings in which.

Figure 4:
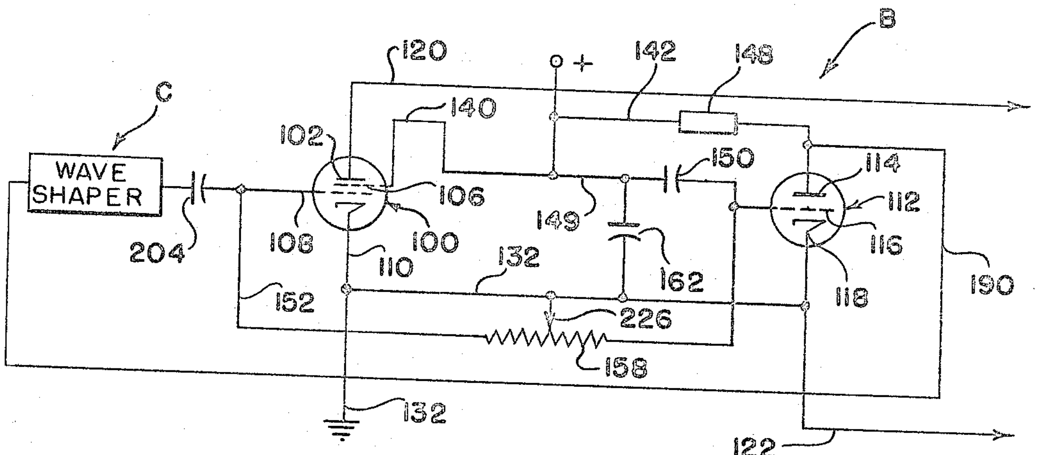
FIGURE 4 is a combined wiring and block diagram illustrating somewhat schematically, and in less detail, the preferred embodiment as shown in FIGURE 3.
Figures 3, 5:
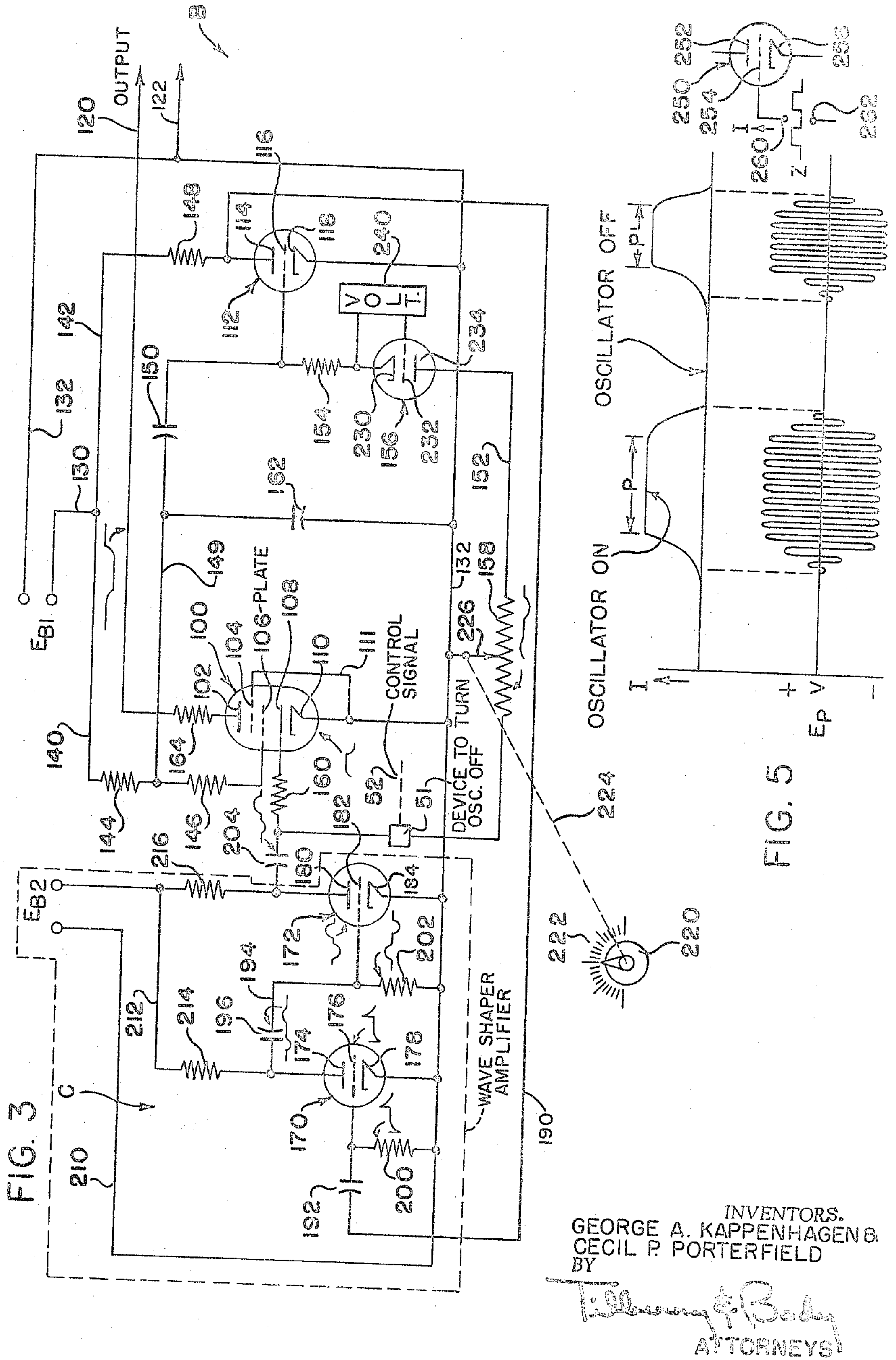
FIGURE 3 is a wiring diagram illustrating somewhat schematically the preferred embodiment of the present invention.
FIGURE 5 is a graph illustrating the opreating characteristics of the preferred embodiment shown in FIGURES 3 and 4 and a schematic view of the oscillator tube.
Figure 6:
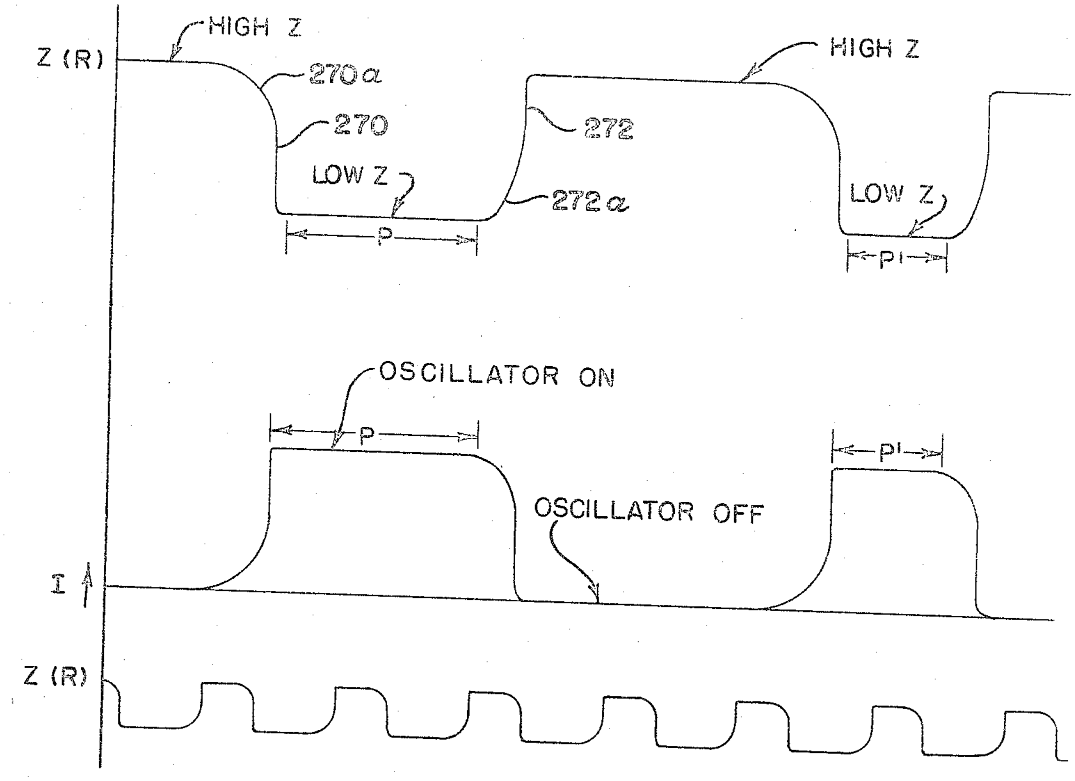
FIGURE 6 is a graphic view illustrating somewhat schematically the shape of the impedance characteristic and grid current curve formed by the preferred embodiment of the present invention shown in FIGURES 3 and 4.
Figure 6A:
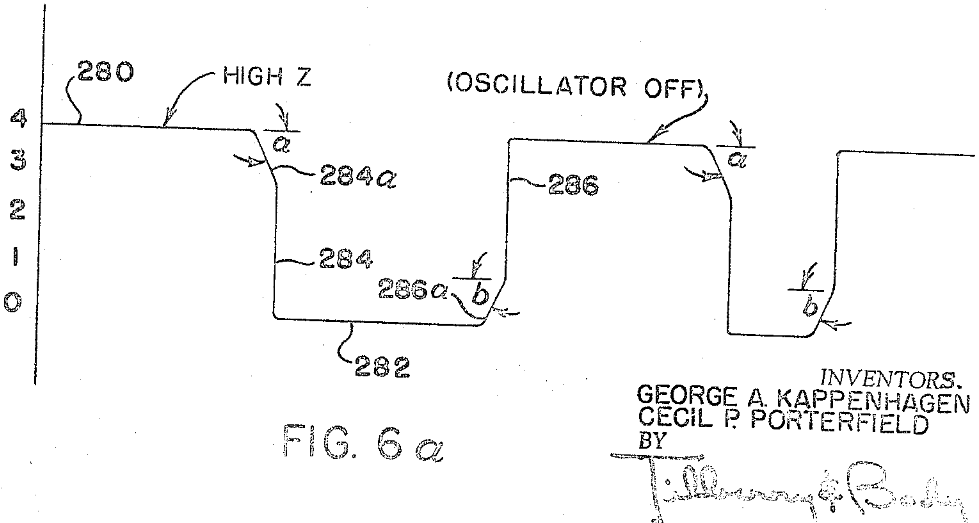
Figure 7:
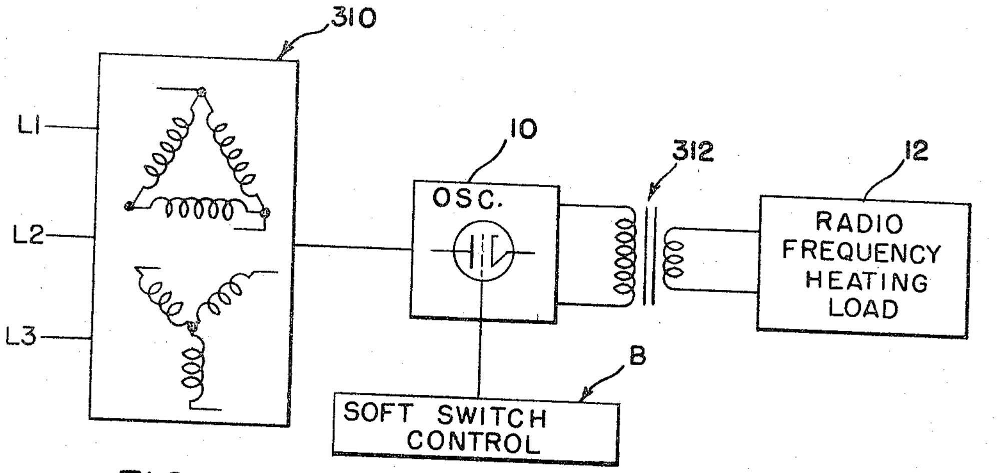
Figure 8:
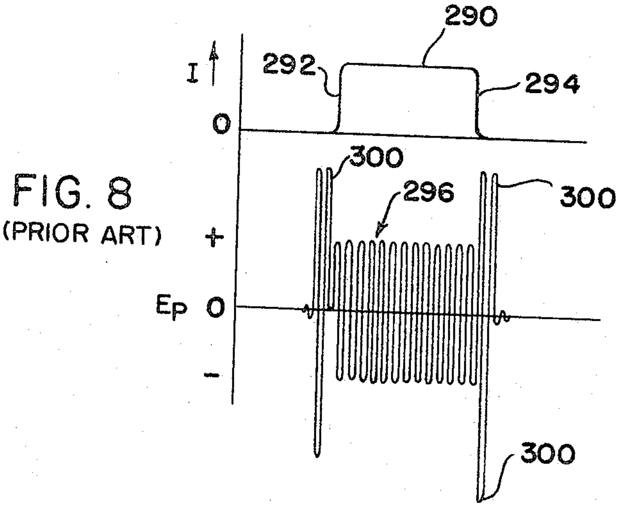
FIG. 8 (PRIOR ART)
Figure 9:
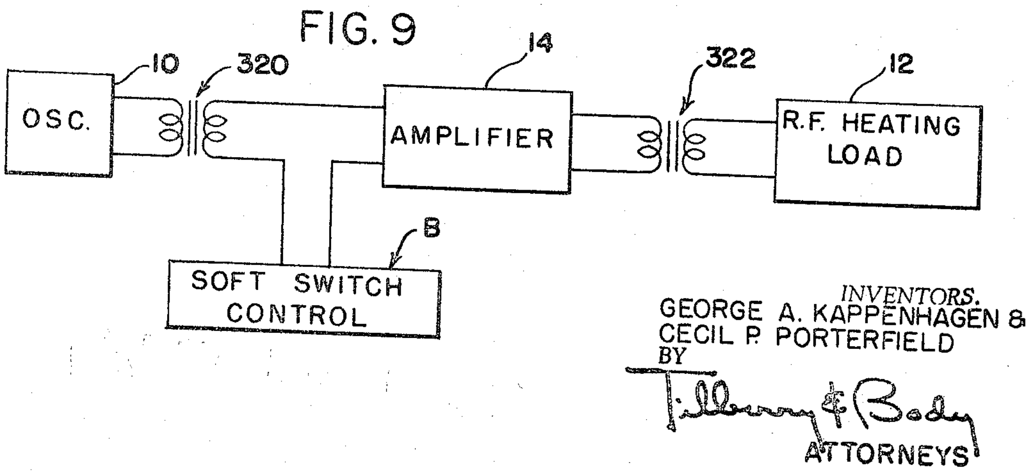

FIGURE 6*a* is a graphic view illustrating the general aspects of the controlled impedance level characteristics created by the preferred embodiment shown in FIGURES 3 and 4;

FIGURE 7 is a block diagram illustrating the environment of the preferred embodiment shown in FIGURES 3 and 4;

FIGURE 8 is a graphic view illustrating the operating characteristics of the prior art; and, FIGURE 9 is a block diagram illustrating somewhat graphically a modification of the embodiment of the present invention shown in FIGURE 7.

Figures 1, 2:
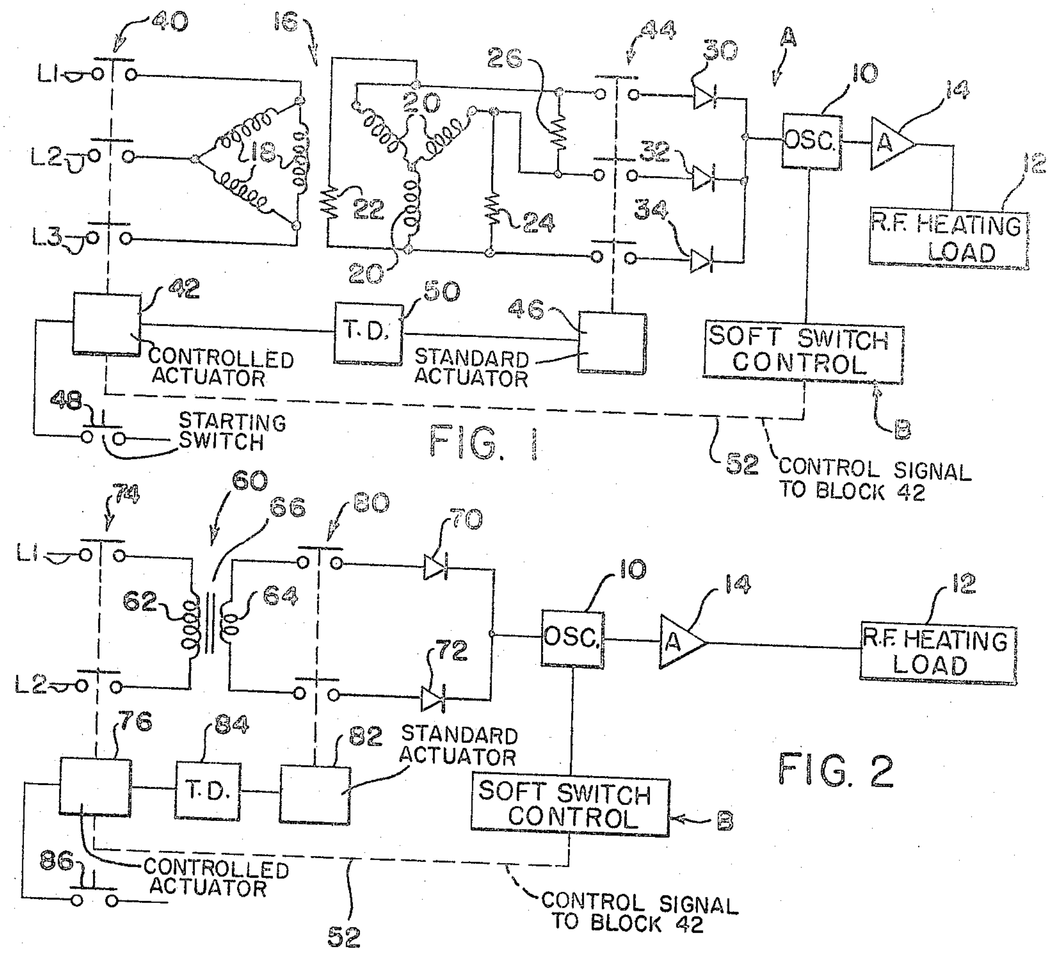
FIGURE 1 is a schematic, combined wiring and block diagram illustrating an embodiment of the present invention wherein the input line supply is three phase.
FIGURE 2 is a schematic, combined wiring and block diagram illustrating another embodiment of the present invention wherein the input line supply is single phase.

Referring now to the drawings wherein the showings are for the purpose of ilustrating preferred embodiments of the invention only and not for the purpose of limiting same, FIGURE 1 shows an apparatus A generally adapted for industrial heating and, more specifically, adapted for induction heating of a workpiece. The apparatus A includes a radio frequency oscillator 10, which, in accordance with the preferred embodiment of the present invention, has an output frequency of 400 kilocycles. It is appreciated that the oscillator 10 may have various other output frequencies without departing from the intended spirit of the present invention. Connected to the output of the oscillator 10 there is a radio frequency heating load 12 which, in accordance with the preferred embodiment of the present invention, is an inductor or heating coil for inductively heating a workpiece positioned within, or adjacent, the coil. Between the oscillator and the load, there is illustrated an amplifier 14 for amplifying the output of the oscillator before it is applied to the load; however, in practice such an amplifier is generally not used. The amplifier 14 is shown only for illustrative purposes to indicate that such an amplifier is within the contemplation of the present invention.

The oscillator 10 receives power from the three phase alternating current line supply, designated by lines L1, L2 and L3, which supply is connected onto a transformer 16 positioned between the oscillator and the line supply. This transformer includes a plurality of primary windings 18, secondary windings 20 and a ferro-magnetic core, not shown, for inductively coupling the primary and secondary windings. The secondary windings are provided with phase-to-phase resistors 22, 24 and 26 across the output of transformer 16. Positioned between the output of the transformer and the input of oscillator 10 is a solid state rectifying means, such as solid state silicon cells or rectifiers 30, 32 and 34 for rectifying the output of the transformer before it is applied to the oscillator. In this manner, the alternating current of line supply, L1 L2 and L3 is rectified into a DC voltage source for driving the oscillator 10.

The particular construction of the oscillator 10 is not illustrated because the present invention contemplates the use of various oscillator circuits. Generally, the oscillator circuit 10 includes at least one oscillator tube having at least a plate, cathode and grid, or corresponding components, connected with external components in such a manner that the application of a DC voltage, from the rectifying means, across the plate and cathode of the tube will cause an oscillating output of the oscillator circuit. This oscillating output is applied to the load 12 for accomplishing the heating function of the complete installation. Between the transformer 16 and the alternating current, three phase line supply, L1, L2 and L3, there is positioned a switch means or circuit breaker 40 controlled by an appropriate device, illustrated as block 42, which device 42 may take the form of a conventional solenoid control for the line supply circuit breaker 40. When device 42 is energized, the circuit breaker 40 is closed to apply the alternating current to the primary windings 18.

As so far described, the apparatus A is constructed in accordance with the normal practice in the industrial heating art. The oscillator 10 is started by closing the line supply circuit breaker 40. It has been found, with this construction, that the application of the line voltage across the primary windings 18 causes the ferro-magnetic core of transformer 16 to create transient fields. These transient fields induce transient voltages within the secondary windings 20, which voltages have large magnitudes and are applied across the solid state rectifiers 30, 32 and 34. Unless the rectifiers are selected to have extremely high voltage ratings or voltage capacities, these high transient voltages tend to puncture the plates of the rectifiers and, thus, destroy the solid state recifiers. Since the transient voltages applied across the rectifiers are considerably larger in magnitude than the voltages applied across the rectifiers during normal operation, these transient voltages necessitate the construction of the rectifiers with extremely high voltage capacities compared to the voltage capacity necessary for the normal operation of the rectifiers. This increased voltage capacity, not only increases the size of the rectifiers, but also increases their cost.

One aspect of the present invention is directed to an arrangement for preventing high transient voltages across the solid state rectifiers 30, 32 and 34. In accordance with this aspect of the invention, there is provided a switch means or circuit breaker 44 between the output of transformer 16 and the rectifiers 30, 32 and 34. This circuit breaker 44 is opened and closed by a control, represented as block 46, which control 46 may take the form of a somewhat common solenoid. Upon actuation of control 46, the circuit breaker 44 is closed to connect the transformer 16 with the solid state rectifiers 30, 32 and 34. To start the oscillator 10, there is provided a schematically represented starting switch 48 which switch, when closed, actuates device 42 to close the circuit breaker 40 so that alternating current is supplied to the primary windings 18 of the transformer. Between device 42 and control 46 there is provided a time delay device 50 which causes actuation of the control 46 a predetermined time after the actuation of device 42 by starting switch 48. Accordingly, in operation, the switch 48 is closed to energize the transformer 16. After a predetermined time, which allows decay of transient fields within the core of transformer 16, the time delay device 50 causes actuation of control 46 for closing the circuit breaker 44. In this manner, the rectifiers 30, 32 and 34 are not connected to the output of the transformer 16 until after the transient fields created within the core of the transformer 16 have had an opportunity to decay below damaging levels. The selection of the necessary time is within the skill of a person in the art of transformers and can be varied according to the particular application involved. In accordance with the preferred embodiment of the invention the time delay is less than 100 microseconds. However, the response time of the control 46 may be such to increase the actual delay in closing switch means 44. By this arrangement, transient voltages are prevented, or substantially limited, in the secondary windings 20 so that the transient voltages will not cause damage to the rectifiers 30, 32 and 34.

It has been found that other sources of transient voltages within the apparatus A can cause damage to the solid state rectifiers 30, 32 and 34. For instance, if the oscillator is conditioned to oscillate immediately upon the application of the DC voltage from the rectifiers 30, 32 and 34, transient voltages are developed in the oscillator 10 upon closing of the circuit breaker 44. These transient voltages can cause substantial damage to the solid state rectifiers in a manner similar to the damage caused by the transient voltages created in the secondary winding 20 of the prior art devices as discussed above. This difficulty is completely overcome by the present invention, as shown in FIGURE 1, which includes a soft switch control B for varying the power output of oscillator 10. The soft switch control B forms an important part of the present invention and it will be described hereinafter in detail. To appreciate the presently discussed aspect of the invention, it must be understood that the control B is provided with an arrangement whereby the oscillations of oscillator 10 may be blocked. In other words, the control B is provided with means for turning the oscillator off, such as inserting a high resistance in the grid circuit of the oscillator tube or applying a biasing voltage to the grid circuit. The oscillator blocking means is schematically shown as a block 51 and a control line, represented by dashed line 52, which receives a control signal when means 51 of the control B is conditioned so that the oscillator is turned off. This control signal applied to line 52 allows operation of device 42.

If the means 51 of control B is conditioned to turn the oscillator on, there is no control signal applied to line 52 and the switch 48 cannot energize device 42. Thus, in operation, the oscillator is turned off before the device 42 and control 46 can be energized. If the oscillator is conditioned to oscillate between the time device 42 is energized and the time the control 46 is energized, which is unlikely, the device 42 drops out so that power is removed from the transformer 16.

By this arrangement, the DC voltage from rectifiers 30, 32 and 34 is always applied to the oscillator 10 when the oscillator is turned off. This prevents transient voltages from being fed from the oscillator back to the rectifiers 30, 32 and 34. In accordance with a further aspect of the present invention, the switching of the oscillator on and off is controlled in such a way that transient voltages or voltage surges are not developed. This feature will be hereinafter described in detail. Consequently, even when the oscillator is subsequently turned on, very slight transient voltages are applied to the rectifiers 30, 32 and 34. By so constructing the apparatus A, the solid state rectifiers can have a voltage capacity, or rating, substantially commensurate with the normal operating conditions of the apparatus without damage to the solid state rectifiers.

A slight modification of the embodiment of the invention shown in FIGURE 1 is illustrated in FIGURE 2 wherein a single phase alternating current line supply across line L1 and L2 is applied to a transformer 60 having primary windings 62, secondary windings 64 and a ferro-magnetic core 66. The output of the transformer 60 is applied to the solid state rectifiers 70, 72 which rectify the output of the transformer so that it can be applied across the plate and cathode of the oscillator 10. A switch means or circuit breaker 74 is operated by a control device represented by block 76. Between the transformer and the rectifiers 70, 72 there is provided a further switch means or circuit breaker 80 operated by a control, represented as block 82, which control 82 is connected to device 76 through a time delay device 84. Operation of the oscillator is controlled by a starting switch 86, similar to starting switch 48 of FIGURE 1. The operation of the embodiment shown in FIGURE 2 does not depart substantially from the operation of the embodiment of the invention shown in FIGURE 1; therefore, further description of the operation has been eliminated for the purposes of simplicity.

In the past, the output power of the oscillator 10, as shown in FIGURES 1 and 2, has been controlled by changing the applied DC voltage, tuning the output circuit, providing variable power taps on an output transformer or varying the grid bias voltage, to name only a few. All of these have been unsatisfactory. The primary aspect of the present invention is directed toward a control for the oscillator 10 which allows the output power of the oscillator to be smoothly varied through a relatively large range. To accomplish this function, in accordance with the present invention, there is provided, what can be termed a soft switch control B, which control B creates an electrical signal comprising a succession of pulse-like shapes each having a wave front, a body and a wave back with the wave front and wave back having an incipient vertical slope of controlled low order over a substantial length of the wave front and wave back. Such an electrical signal may take various embodiments; however, in accordance with the preferred embodiment of the invention, the signal is formed from a succession of high and low impedance or resistance levels. The succession of high and low impedance levels acts somewhat as a succession of pulses and this succession of impedance levels is interposed within the grid circuit of the oscillator 10 in such a fashion that the high impedance levels in the grid circuit turn the oscillator off and the low impedance levels in the grid circuit turn the oscillator on. Then by simply controlling the relative time of the high and low impedance levels, the duty cycle of the oscillator, and thus the output power of the oscillator, can be easily adjusted over a large range.

By increasing the time of the high impedance levels with respect to the time of the low impedance levels, the oscillator will remain off a greater portion of the time and the power output will be decreased. The converse is also true. By increasing the time of the low impedance levels with respect to the time of the high impedance levels, the oscillator will remain on a greater portion of the time and the output power of the oscillator will be increased. After the relative time of the impedance levels is adjusted to obtain the desired output power, the succession of high and low impedance levels continues to switch the oscillator on and off during the operation of the oscillator with the output power being determined by the ratio of the time on to the time off. The switching is rapid and the oscillator may be turned on and off many times in a second.

When rapidly switching the oscillator on and off with a succession of high and low impedance levels or with voltage pulses in the grid circuit, transient voltages and voltage surges are established if the impedance levels swing abruptly between high and low levels or if the voltage pulses have a vertical wave front and wave back; therefore, in accordance with the invention, the high and low impedance levels used in the preferred embodiment are joined by a transfer contour which has a controlled shape so that the switching between off and on is accomplished with a minimum of transients being formed. The present invention is directed toward a soft switch control B for accomplishing this function.

Referring now to FIGURE 3, there is illustrated a preferred embodiment of the soft switch control B for performing the function mentioned above. The control B includes a pentode tube 100 having a plate 102, suppressor grid 104, screen grid 106, control grid 108 and a cathode 110 connected onto the suppressor grid 104 by line 111. The pentode tube 100 is operably connected with a tube 112, in the form of a triode, having a plate 114, grid 116 and cathode 118. These two tubes coact with each other in a manner similar to the two tubes of a multivibrator; however, they are utilized, with the other circuit components to be hereinafter described, to create a controlled variable impedance in the form of a rapid succession of high and low impedance levels with a controlled transfer contour or rate of change between these levels. These impedance levels are applied across lines 120, 122 connected within the grid circuit of the oscillator 10. The oscillator is turned on when the impedance level measured across lines 120, 122 is low and the oscillator is turned off when the impedance across lines 120, 122 is high. In other words, the output of the soft switch control B is a controlled pulsating impedance characteristic having a specially controlled contour, which will be hereinafter described in detail.

Referring now to the other components of the soft switch control B, a first DC voltage $E_{B1}$ is applied across lines 130, 132 with line 132 connected directly to the output line 122 and to the cathodes 110, 118. The line 130 is connected to lines 140, 142. Referring now more specifically to line 140, this line is connected to screen grid 106 of pentode 100 through resistors 144, 146. The screen grid 106 of the pentode acts as a plate in the control B and the plate 102 of the pentode is used only to electron couple the output line 120 to the pentode 100. Line 142 is connected to plate 114 through a resistor 148.

To connect the screen grid 106, acting as a plate, to the control grid 116 of tube 112, there is provided a line 149 including a capacitor 150. The connection between grid 116 of tube 112 and the control grid 108 of tube 100 is accomplished by line 152 having a resistor 154, a triode tube 156, the purpose of which will be described later, a rheostat 158, a resistor 160 and the oscillator blocking means 51. Capacitor 162 is connected between line 149 and line 132 so that the control B operates in a manner somewhat similar to a multivibrator with the exception that the output line 120 is electron coupled to the pentode 100 through a resistor 164 and a variable impedance, which is substantially pure resistance, is imposed by the control B across the output lines 120, 122 instead of a current or voltage pulse.

To complete the operation of control B in a fashion similar to a multivibrator, the plate 114 of tube 112 must be coupled onto the control grid 108 of the tube 100. In accordance with the present invention, this connection is made by line 190 which extends through a multi-stage amplifier generally designated as C. The components of this multi-stage amplifier C are selected to provide, in combination with the previously described components, a wave shaping function for the output of the soft switch control B. This multi-stage amplifier circuit C includes amplifying tubes 170, 172 having plate 174, grid 176 and cathode 178 and plate 180, grid 182 and cathode 184, respectively. As mentioned before, the plate 114 is connected to the control grid 108 by line 190. Line 190 includes a capacitor 192 and is initially connected to grid 176 of tube 170. Plate 174 of tube 170 is coupled onto grid 182 by line 194 having a capacitor 196. Between line 132 and the grids 176, 182 there are provided resistors 200, 202, respectively. The plate 180 of tube 172 is coupled to the grid 108 through capacitor 204 to form the final link between the grid 108 and the plate 114. The combinations of capacitor 192 and resistor 200; capacitor 196 and resistor 202; and, capacitor 204 and the resistor including the left hand portion 158′ of rheostat 158 are each standard differentiating circuits as disclosed on page 262 of Engineering Electronics, Ryder (McGraw-Hill, 1957). Power is applied to the multi-stage amplifier C by lines 210, 212 which are connected onto a DC voltage source, represented by $E_{B2}$. In line 212 there are provided resistors 214, 216 between the plates 174, 180, respectively. The wave shapes at the various points in the wave shaper C are shown in FIGURE 3. It is noted that the differentiating circuits cause an ever decreasing slope of the voltage wave form from one stage of the wave shaper or amplifier C to the next. The wave form at the left portion 158′ of the rheostat 158 gradually starts the conduction and gradually turns off the conduction of tube 100. For this purpose, only the first part of the voltage wave form at the left portion 158′ of rheostat 158 is used. After the tube is conducting, it remains conducting until turned off. This is shown by the wave form at tube 100. This particular wave form is a current wave. The impedance across tube 100 is the mirror image of its current, and the shape of the impedance across lines 120, 122 is shown above line 120 in FIGURE 3. This explanation of the operation of the wave shaper in the multi-vibrator circuit is well appreciated from the disclosed circuit. Of course, the shape of a gradual turn on and turn off voltage is fixed by the values of the components, and it is only slightly affected by the adjustment of the rheostat 158.

In operation, the output of soft switch control B is across lines 120, 122 and this output is in the form of a succession of high and low impedance levels to be hereinafter described in detail. To change the relative lengths, or relative time, of the high and low impedance levels, there is provided a manually adjustable dial 220 rotatably mounted adjacent an indicator 222 and physically connected by link 224 to an adjustable contact 226. As the dial 220 is rotated, contact 226 is moved along rheostat 158 to control the relative length of time of the high impedance levels and the low impedance levels. By this construction, the oscillator, which is being rapidly switched on and off by the succession of impedance levels, can be controlled to adjust the output power of the oscillator in a manner described above. Dial 220 may also be used to actuate blocking means 51 to turn the oscillator to the off position prior to starting.

Referring now to the tube 156 in line 152, the tube includes a cathode 230, a grid 232 and a plate 234. Connected across the cathode and grid is a voltage signal device 240 which imposes a signal across the cathode and grid of tube 156 in accordance with variations in the line voltage which determines the DC voltages $E_{B1}$ and $E_{B2}$. As the voltage signal changes, the conductivity or impedance of tube 156 changes. By using tube 156, the operation of the soft switch control B is not drastically changed with fluctuation of the line voltage. Of course, this tube 156 could be replaced by a fixed resistor, which would not have the voltage compensating function, without departing from the intended spirit and scope of this invention.

Referring now to FIGURE 4, the soft switch control B is shown in a combined block and wiring diagram which is substantially less detailed than FIGURE 3. FIGURE 4 is included to show the basic operating components of the control B as shown in detail in FIGURE 3.

The components illustrated in FIGURE 3 are selected so that the output across lines 120, 122 is a rapid succession of high and low impedance levels which levels switch the oscillator 10 on and off by being interposed within the grid circuit to control the current flow in the grid circuit. The operation of the soft switch control B as illustrated in FIGURES 3 and 4 is graphically shown in FIGURES 5, 6 and 6*a*.

Referring now to FIGURE 5, the tube 250 of the oscillator 10 is schematically illustrated as having a plate 252, a grid 254 and a cathode 256. The control B is positioned between points 260, 262 in the grid circuit with lines 120, 122 being connected to these points. In this manner, a rapid succession of high and low impedances is interposed by control B in the grid circuit of the tube 250. The low impedance level in the grid circuit, as is common knowledge, "allows" the necessary feed back to sustain oscillation of the oscillator. Conversely, high impedance in the grid circuit blocks the sustaining feed back of the oscillator and "prevents" oscillations.

In the upper and lower graphs of FIGURE 6, the output of the control B is graphically illustrated. In the lower graph, the output of control B is shown as a succession of high and low impedance levels which are used to switch the oscillator tube 250 rapidly off and on. The relative time on to time off gives the average output power and when the oscillator is on it is operating at substantially maximum power and efficiency. The switching on and off takes place many times in a second. The time of one complete switching cycle is determined by the selection of the components in control B and this may be varied without departing from the present invention. The upper graph of FIGURE 6 also shows the output of control B; however, only two single cycles are shown with the cycle on the left having a greater length of time for the low impedance level than the cycle on the right. This graph illustrates the manner by which the relative time of high impedance, i.e., time oscillator is off, to time of low impedance, i.e., time oscillator is on, is adjusted to change the average output power of the oscillator. Hereinafter a more detailed description will be given of this upper graph in FIGURE 6.

Referring to the middle graph of FIGURE 6, the grid currents caused or allowed by the impedance levels in the upper graph are illustrated. When the impedance is high, the grid current is low and when the impedance is low, the grid current is high. In essence, the current in the grid circuit follows, inversely, the impedance imposed in the grid circuit by the lines 120, 122. A similar grid current graph could be constructed to correspond with the operating impedance characteristics as shown in the lower graph of FIGURE 6 and such a current graph would have a rapid succession of current pulses with a high current pulse corresponding to a low impedance level. When the current is high in the grid circuit, the oscillator is turned on, whereas the oscillator is turned off when the current in the grid circuit is low or zero. Accordingly, variations in the impedance across lines 120, 122, as controlled by the soft switch control B, alternately turns the oscillator on and off in rapid succession. The amount of time which the oscillator is on or off is determined by the width of the high impedance level as compared to the width of the low impedance level.

The upper graph of FIGURE 6 is directed to an illustration of the manner by which the output power of the oscillator can be controlled by adjusting soft switch control B. The length of the low impedance level is represented by P in the left cycle. This may be changed to a different value, such as the smaller length P′, shown at the right of this same graph. Such a change in the length of the low impedance level is determined by adjustment of the contact 226 of rheostat 158 in the soft switch control B. The relative length of the low impedance level and the high impedance level shows up as a corresponding changes in the length of the high current level to the low current level as illustrated in the middle graph of FIGURE 6. These changes in the current flow in the grid circuit of the oscillator tube 250 causes a corresponding change in the output envelope of the oscillator as shown in FIGURE 5. The upper graph of FIGURE 5 and the middle graph of FIGURE 6 are substantially identical and the output envelope shown in the lower graph of FIGURE 5 corresponds to these two current graphs.

The upper two graphs of FIGURE 6 and the graphs of FIGURE 5 do not show a rapid succession of high and low impedance levels. They are used only to show the adjusting feature of the circuit shown in FIGURES 3 and 4. It is appreciated that during use of the oscillator control B, the successive high and low impedance levels follow a given uniform pattern of a type shown in the lower graph of FIGURE 6, which pattern is determined by the position of the contact 226. This gives a succession of uniform output envelopes for the oscillator corresponding to the low impedance levels and these envelopes are spaced from each other a distance corresponding to the high impedance levels. The envelope length or spacing therebetween determines the average power output of the oscillator. The rheostat 158 may be adjusted so that the oscillator is substantially oscillating at all times, i.e., high power, or substantially off at all times, i.e., low power.

The shape of the impedance level as shown in the upper graph of FIGURE 6 and, more schematically as shown in FIGURE 6*a*, forms an important part of the present invention. Basically, as the impedance swings between the high levels and the low levels, the impedance changes gradually during the first part of the swing and then abruptly thereafter. This controlled gradual incipient or initial swing from one level to the other has been proven in practice to substantially eliminate all transient voltages or voltage surges in the oscillator circuit. The generally vertical contours 270 and 272, shown in FIGURE 6, between the high and low impedance levels are referred to as the "transfer contours." These transfer contours each have a gradual incipient or initial portion **270*a*, 272*a***, as distinguished from a sudden vertical change between the high and low impedance levels.

This gradual incipient or initial portion is controlled by the proper selection of the components of control B shown in FIGURES 3 and 4. Primarily, the contour is controlled by the wave shaping or multi-stage amplifier circuit C between the plate 114 of tube 112 and grid 108 of tube 100. Of course, it is appreciated that all of the components assist in creating this gradual incipient or initial slope of the transfer contours of the impedance or resistance graph shown in FIGURE 6.

This controlled initial portion of each transfer contour is illustrated more generically in FIGURE 6*a*, wherein the high impedance level 280 is approximately four units above the low impedance level 282. Between the high and low impedance levels there are transfer contours 284, 286. Referring now more specifically to contour 284, the incipient or initial portion 284*a* extends over substantially 25% or one-fourth of the initial impedance swing from the high level to the low level. This initial or incipient portion 284*a* forms a vertical slope measured by an angle *a* which angle should not be more than 85°. In other words, for the first 25% of change between the high and low impedance levels, the vertical slope of the transfer contour 284 should be no greater than 85°. A small or gradual imepdance change for a substantial portion of the incipient or initial part of the transfer contour 284 has been found to reduce the transients caused by swinging from the high level of impedance to the low level of impedance. Of course, it has also been found that the more gradual the vertical slope of portion 284*a*, the more effectively the transient voltages or voltage surges are removed. Thus, in accordance with the broadest aspect of the invention, the vertical slope shall not exceed approximately 85° for a substantial portion of the transfer contour 284. In accordance with the preferred embodiment of the invention, the initial portion is a gradually changing curve having an approximate slope of 35°–45° in the first 25% of the change in impedance with the result that substantially all detrimental transient voltages or voltage surges are eliminated from the oscillator and its accessories. The initial portion 286*a* of transfer contour 286 has a vertical slope of not more than 85°, represented by angle *b*, for at least 25% of the swing between the low impedance level 282 and the high impedance level 280. If the transfer contours swing too vertical in approximately the first 25% of the change in impedance, it has been found that substantial transients are created within the oscillator circuit.

Referring again to the lower graph in FIGURE 5, it is noted that the output envelopes of the oscillator, the lengths of which are determined by the relative length of high and low impedance levels, are relatively smooth and there are no spikes or peak voltages which can destroy the operating components of the oscillator. Accordingly, it is possible to use operating components for the oscillator and accessories which have only the needed voltage capacity or rating. This is distinguished from one prior art power control as shown in FIGURE 8 wherein the power of an oscillator is controlled by a voltage pulse in the grid circuit, such as pulse 290. This voltage pulse has a substantially vertical initial and trailing contour; therefore, the oscillator output envelope 296 has spikes or peak voltages 300 at the beginning and end thereof. In accordance with this prior art power control, the components of the oscillator and its accessories had to be constructed or selected to have a voltage capacity greater than the value of the voltage spikes or peaks. Also, there was no accurate way of determining how large these voltage peaks would be; therefore, even if larger capacity components were utilized, the components were often damaged by these transient voltages or voltage surges when the oscillator was turned on and off. For this reason, the prior art oscillator control, the operating characteristics of which are generally depicted in FIGURE 8, has not been completely successful in the field of industrial heating.

FIGURE 7 illustrates, in block diagram, the connection of the soft switch control B to the grid of the oscillator tube in oscillator 10. In this figure, a transformer represented by block 310 is connected to the oscillator and the oscillator is connected by a transformer 312 to the load or heating device 12. In some cases, an amplifier 14, as shown in FIGURE 1, may be positioned between the oscillator 10 and the radio frequency heating load 12. When such an amplifier is used, it is possible to adapt the soft switch control B to control the amplifier instead of the oscillator itself. Such an arrangement is shown in FIGURE 9 wherein the oscillator is connected by a transformer 320 to the amplifier 14 and the amplifier 14 is connected by a transformer 322 to the load. The soft switch control B is connected to the internal circuit of amplifier 14 to control the power supplied by the oscillator to the load.

The rheostat 158 may be adjusted to a position so that the resistance across the lines 120, 122 remains high at all times. In this manner the oscillator is blocked from oscillation. When this condition is set, a signal is applied to line 52 in FIGURES 1 and 2 by a circuit, not shown, and the device 42 can be energized by switch 48 to close circuit breaker 40. If the oscillator is not blocked from oscillation no releasing signal is imposed on line 52 and the alternating current power supply, L1, L2 and L3, cannot be applied to the transformer nor to the oscillator 10. It is appreciated that other oscillator blocking arrangements could be provided, such as a separate high bias voltage on the grid circuit of oscillator 10, without departing from the present invention.

Also, it is appreciated that the succession of high and low impedance levels could be created by a circuit including a rheostat and a synchronous or variable speed motor driving the contact along the rheostat at the proper rate to create an alternate high and low impedance level with a transfer contour as shown in FIGURES 6 and 6*a*. The impedance, i.e., resistance, across the rheostat could then be imposed in the grid circuit of the oscillator to rapidly switch the oscillator off and on. The impedance per length of the rheostat could be varied to obtain the desired transfer contour or the rate of movement of the contact at various stages of its movement could be controlled to obtain this transfer contour. All of the mechanics of this arrangement are within the ordinary skill of a person in the art of making rheostats and their control mechanisms.

The present invention has been described in connection with certain preferred embodiments; however, it is appreciated that various changes may be made in the various components and circuits without departing from the intended spirit and scope of the present invention as defined by the appended claims.

Having thus described our invention, we claim:

1. In a radio frequency heating device including a heating load and a radio frequency oscillator circuit for powering said load, said oscillator circuit having a controllable grid circuit, the improvement comprising: a circuit for creating a succession of high and low impedance levels forming a pulse-like pattern when plotted on a time axis with the pulses being generally equally spaced; said high impedance level being sufficient to block oscillation of said oscillator circuit and said low impedance level being insufficient to block oscillation of said oscillator circuit; means for imposing said impedance levels in the grid circuit of said oscillator circuit to start, sustain and stop oscillations of said oscillator circuit; and, means for changing the relative lengths of said high and low impedance levels to vary the duty cycle of said oscillator circuit, said creating circuit comprising a dual tube multi-vibrator circuit with at least two tubes and the plate to cathode of the first tube being connected across the grid circuit of the second tube by a feed back line, and an integral wave shaping circuit in said feed back line to shape the output pulses of said second tube to produce said impedance levels, said wave shaping circuit including a multi-stage amplifier with each amplifier having an input created across a resistor in a capacitor-resistor differentiating circuit.

2. The improvement as defined in claim 1 wherein there are generally vertical transfer contours between said levels, said transfer contours having a slope of 35°–45° during the first one-fourth of the change in impedance levels.

3. The improvement as defined in claim 1 wherein said means for imposing said impedance levels in said grid circuit of said oscillator circuit comprises a second plate in a selected one of said two tubes with said second plate and the cathode of said selected tube being used to connect said second tube in series in said grid circuit.

4. The improvement as defined in claim 3 wherein there is included a resistor in series with said selected tube.

5. The improvement as defined in claim 3 wherein said selected one of said tubes is said second tube.

6. In a radio frequency heating device including a heating load and a radio frequency oscillator circuit for powering said load, said oscillator circuit having a controllable grid circuit, the improvement comprising: a circuit for creating a succession of high and low impedance levels forming a pulse-like pattern when plotted on a time axis with the pulses being generally equally spaced; said high impedance level being sufficient to block oscillation of said oscillator circuit and said low impedance level being insufficient to block oscillation of said oscillator circuit; means for imposing said impedance levels in the grid circuit of said oscillator circuit to start, sustain and and stop oscillations of said oscillator circuit; and, means for changing the relative lengths of said high and low impedance levels to vary the duty cycle of said oscillator circuit, said creating circuit comprising a dual tube multivibrator circuit with at least two tubes and the plate to cathode of the first tube being connected across the grid circuit of the second tube by a feed back line and an integral wave shaping circuit in said feed back line to shape the output pulses of said second tube to produce said impedance levels, generally vertical transfer contours between said levels, said transfer contours having a slope of 35°–45° during the first one-fourth of the change in impedance between said levels.

References Cited

UNITED STATES PATENTS

| | | | |
|---|---|---|---|
| 1,749,739 | 3/1930 | Fluharty | 325—170 X |
| 2,089,781 | 8/1937 | Buschbeck | 331—173 X |
| 2,283,724 | 5/1942 | Cooper | 325—170 X |
| 2,365,583 | 12/1944 | Nagel et al. | 328—194 |
| 2,401,619 | 6/1946 | Trevor | 325—164 X |
| 2,611,091 | 9/1952 | Boykin | 331—173 |

FOREIGN PATENTS 587,940 5/1947 Great Britain.

OTHER REFERENCES

Goodman: "Chirp-Free Break-In Keying," October 1953, pp. 28–30, 114.

ROY LAKE, *Primary Examiner.*

J. B. MULLINS, *Assistant Examiner.*